United States Patent
Konno et al.

(10) Patent No.: US 9,422,400 B2
(45) Date of Patent: Aug. 23, 2016

(54) GRANULAR POLYARYLENE SULFIDE AND PROCESS FOR MANUFACTURING THE SAME

(71) Applicant: Kureha Corporation, Tokyo (JP)

(72) Inventors: Akihiro Konno, Tokyo (JP); Ken-Ichi Takaki, Tokyo (JP); Yui Yoshida, Tokyo (JP); Yasuhiro Suzuki, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 14/378,854

(22) PCT Filed: Mar. 29, 2013

(86) PCT No.: PCT/JP2013/059497
§ 371 (c)(1),
(2) Date: Aug. 14, 2014

(87) PCT Pub. No.: WO2013/147141
PCT Pub. Date: Oct. 3, 2013

(65) Prior Publication Data
US 2015/0065664 A1 Mar. 5, 2015

(30) Foreign Application Priority Data
Mar. 30, 2012 (JP) .................. 2012-083010

(51) Int. Cl.
*C08G 75/14* (2006.01)
*C08G 75/02* (2016.01)

(52) U.S. Cl.
CPC ............ *C08G 75/14* (2013.01); *C08G 75/0209* (2013.01); *C08G 75/0231* (2013.01); *C08G 75/0268* (2013.01)

(58) Field of Classification Search
CPC .................................................. C08G 75/0268
USPC .......................................................... 525/537
See application file for complete search history.

(56) References Cited

U.S. PATENT DOCUMENTS

| 4,535,149 A | 8/1985 | Ebert et al. |
| 4,820,801 A | 4/1989 | Inoue et al. |

(Continued)

FOREIGN PATENT DOCUMENTS

| CN | 1558925 A | 12/2004 |
| CN | 102325826 A | 1/2012 |

(Continued)

OTHER PUBLICATIONS

Machine Translation of JP 2010-126621.*

(Continued)

*Primary Examiner* — Mike M Dollinger
(74) *Attorney, Agent, or Firm* — Birch, Stewart, Kolasch & Birch, LLP

(57) ABSTRACT

A granular polyarylene sulfide; (i) the granular polyarylene sulfide containing an —S— substituent at the terminal, the substituent being formed by cleavage of a disulfide compound; (ii) the granular polyarylene sulfide being an oversize fraction after sifting with a sieve having a mesh size of at least 38 μm; (iii) the granular polyarylene sulfide having a halogen content of at most 1,500 ppm; and (iv) the granular polyarylene sulfide being a granular polyarylene sulfide having a melt viscosity of 3 to 100 Pa·s when measured under conditions at a temperature of 310° C. and a shear rate of 1,200 $sec^{-1}$. The granular polyarylene sulfide is well balanced in melt viscosity, halogen content, nitrogen content, thermal stability, and yield.

12 Claims, 1 Drawing Sheet

(56) References Cited

U.S. PATENT DOCUMENTS

| | | | |
|---|---|---|---|
| 5,153,305 A * | 10/1992 | Tsuchida | C08G 75/0272 528/373 |
| 7,569,656 B2 | 8/2009 | Kagoshima et al. | |
| 8,859,720 B2 | 10/2014 | Shin et al. | |
| 2002/0183481 A1* | 12/2002 | Vidaurri, Jr. | C08G 75/0268 528/373 |
| 2004/0249118 A1 | 12/2004 | Kagoshima et al. | |
| 2011/0124825 A1* | 5/2011 | Konno | C08G 75/0231 525/537 |
| 2011/0257363 A1 | 10/2011 | Shin et al. | |

FOREIGN PATENT DOCUMENTS

| | | | |
|---|---|---|---|
| EP | 2380921 A2 | 10/2011 | |
| EP | 2383308 A2 | 11/2011 | |
| JP | 62-106929 A | 5/1987 | |
| JP | 2002-201274 A | 7/2002 | |
| JP | 2010-126621 A | 11/2008 | |
| JP | 2010-053335 A | 3/2009 | |
| JP | WO 2010010760 A1 * | 1/2010 | C08G 75/0231 |
| JP | 2011-148870 A | 8/2011 | |
| KR | WO 2010074482 A2 * | 7/2010 | C08G 75/0209 |

OTHER PUBLICATIONS

Chinese Office Action and Search Report, issued Jul. 14, 2015, for Chinese Application No. 201380005933.3, along with English translations.

International Search Report of PCT/JP2013/059497.

European Patent Office communication and extended search report issued in the corresponding European Patent Application No. 13768784.4 on Oct. 29, 2015.

The International Preliminary Report on Patentability and the English translation of the Written Opinion of the International Searching Authority, dated Oct. 9, 2014, issued in the corresponding International Application No. PCT/JP2013/059497.

Second Office Action (including an English translation thereof) issued in the corresponding Chinese Patent Application No. 201380005933.3 on Mar. 21, 2016.

Office Action (including an English translation thereof) issued in the corresponding Korean Patent Application No. 10-2014-7021810 on Mar. 14, 2016.

* cited by examiner

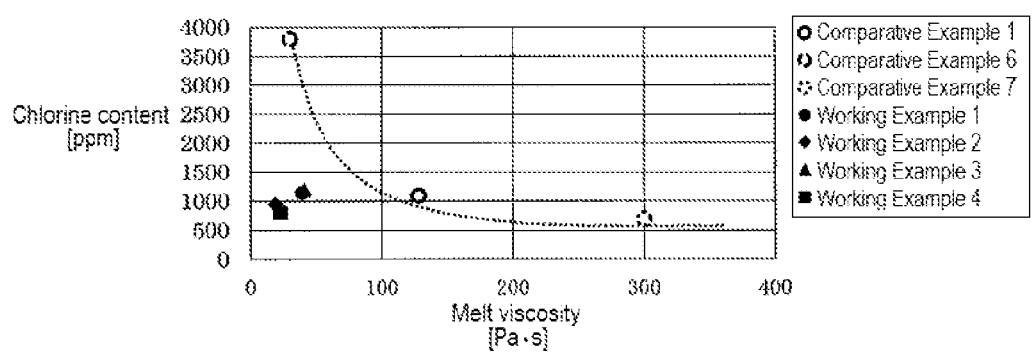

GRANULAR POLYARYLENE SULFIDE AND PROCESS FOR MANUFACTURING THE SAME

TECHNICAL FIELD

The present invention relates to a granular polyarylene sulfide and a process for manufacturing the same. More specifically, the present invention relates to a granular polyarylene sulfide having good thermal stability, low gas generation at the time of molding processing, low halogen content and nitrogen content, low melt viscosity, and highly balanced performance. Furthermore, the present invention relates to a process for manufacturing a granular polyarylene sulfide by polymerizing a sulfur source and a dihalo aromatic compound in an organic amide solvent. During the polymerization step, a polymerization reaction is performed in the presence of a disulfide compound; and at an intermediate stage of the polymerization reaction, at the time of the completion of the polymerization reaction, or before or after the polymerization reaction, a liquid-liquid phase separation state is induced in the presence of a phase separation agent, and the substance is then cooled. The polymer produced after polymerization is sifted with a sieve having a specific mesh size and is recovered with a good yield.

BACKGROUND ART

Polyarylene sulfides (hereafter abbreviated as "PAS"), representative examples of which are polyphenylene sulfides (hereafter abbreviated as "PPS"), are engineering plastics exhibiting excellent heat resistance, chemical resistance, flame retardancy, mechanical strength, electrical characteristics, dimensional stability, and the like. PAS are frequently used in a wide range of fields such as electrical/electronic equipment and automobile equipment due to their moldability into various molded products, films, sheets, fibers, and the like by general melt processing methods such as extrusion molding, injection molding, and compression molding.

A known example of a representative method for manufacturing PAS is a method of reacting a sulfur source and a dihalo aromatic compound in an organic amide solvent such as N-methyl-2-pyrrolidone (hereafter abbreviated as "NMP"). A PAS obtained by this method typically tends to have a structure in which a halogen bonds to the terminal of a polymer and therefore has a high halogen content, even when sufficiently washed in the separation/recovery step after a polymerization reaction. When such a PAS having a high halogen content is used, environmental pollution becomes a problem, as evidenced by halogen regulations in recent years. In ordinary polymerization without phase separation, PAS is mostly separated/recovered as a fine powder after the polymerization reaction, resulting in poor handleability. In addition, a polymer produced during the polymerization reaction becomes less soluble in the organic amide solvent as polymerization progresses, which makes growth response difficult. As a result, it is difficult to obtain a polymer having the targeted melt viscosity with a low halogen content, so there is still a demand for improvement. In order to improve upon the problems described above, a method of performing a polymerization reaction in the presence of a phase separation agent has been developed as a manufacturing method. However, this method has not yet yielded a PAS having satisfactory performance.

In many fields such as the field of electrical/electronic equipment in recent years, PAS have come to be widely used as compounds into which fillers such as glass fibers, for example, are blended. Such compounds ordinarily contain approximately 30 to 50 mass % glass fibers, and since the compounds are used in the field of electrical/electronic equipment or the like, there is not only the problem of reducing the halogen content from the perspective of environmental regulations, but there are also strong demands for a simple molding process. As a means for solving this problem, there is a demand for a PAS having good thermal stability, low gas generation at the time of molding processing, and low melt viscosity. This is because if the melt viscosity of the PAS is high at the time of the melt molding of such a compound, heat degradation of the PAS tends to occur due to localized temperature increases resulting from friction caused by kneading with hard glass fibers. As a result, the thermal stability becomes poor, and the amount of gas generated increases, which causes problems such as the inability to achieve stable and favorable melt molding conditions.

However, when the molecular weight is simply reduced in order to reduce the melt viscosity of the PAS, a PAS with a high halogen content is produced, which is against a reduction in the halogen content. This is presumed to be due to the fact that the number of molecules of the PAS increases with a reduction in molecular weight, and as a result, the number of PAS molecular terminals increases, so the number of PAS molecular terminals to which halogen bonds also increases. In this way, a PAS with a low melt viscosity (that is, a PAS with a low molecular weight) inevitably has a higher halogen content than that of a PAS with a high molecular weight due to a larger number of polymer terminals. In other words, a reduction in the melt viscosity (increase in fluidity) and a reduction in halogen have an antinomic relationship. However, as described above, in the field of electrical/electronic equipment in recent years, there is an increasing demand for regulations to ensure reduced halogen out of environmental considerations, and there is an increasing demand for a PAS having good thermal stability, a low halogen content, and a low melt viscosity.

Japanese Unexamined Patent Application Publication No. 2010-126621A (Patent Document 1) proposes the idea of adding one or more types of compounds selected from the group consisting of mercapto compounds, metal salts of mercapto compounds, phenol compounds, metal salts of phenol compounds, and disulfide compounds in order to obtain a PAS with a low halogen content.

However, in Working Examples 1 to 6 of this Patent Document 1, which use a thiophenol (Working Example 7 uses a phenol), the improvement in chlorine content is limited to approximately 1,200 to 2,100 ppm. In addition, in Working Example 8, which is the only working example using a disulfide compound (diphenyl disulfide) in Patent Document 1, it is reported that the chlorine content was 1,800 ppm, which is still a high chlorine content. Furthermore, as evidenced by the description in Patent Document 1 that "powder-like PAS was obtained" in Working Example 1, the produced PAS is likely in the form of a fine powder rather than a granular form. In order to recover this fine powder-like PAS, a method of recovering the substance by filtration is adopted, but an oligomer with a high chlorine content is also recovered, as described below, which not only makes it impossible to sufficiently reduce the chlorine content, but also leads to the problem that it is difficult to obtain a PAS having good thermal stability and low gas generation at the time of molding processing. Furthermore, the recovery rate of the powder-like PAS obtained by filtration is low at 95% in Working Example 1.

Similarly, in Japanese Unexamined Patent Application Publication No. S59-215323A (Patent Document 2), which uses disulfides, the yield of a PAS obtained by filtration in the case of Working Example 16 using diphenyl disulfide is low at 90.5%.

Furthermore, the thiophenol used in Patent Document 1 is easily oxidized when held in storage or handled at the time of production. Therefore, when producing the substance industrially, fluctuations arise in the molecular weight of the PAS or the halogen (chlorine) reducing effect depending on the degree of oxidation, and industrial production within constant product standards will be difficult.

In addition, since thiophenol or the like has a foul odor, environmental problems arise in the production step and recovery step. Furthermore, there are cases in which the PAS that is produced is also contaminated with the foul odor.

Furthermore, when a sulfur source and a dihalo aromatic compound are polymerized in an organic amide solvent in the presence of an alkali metal hydroxide, the organic amide solvent such as NMP and the alkali metal hydroxide react due to heating, and a compound containing the nitrogen element is produced as an impurity. For example, when NMP and sodium hydroxide (NaOH) are reacted, NMP is subjected to ring opening, and sodium methylamino butanoate [$(CH_3)NH-CH_2-CH_2-CH_2-COONa$] is produced. This compound reacts with p-dichlorobenzene, which is a dihalo aromatic compound, to produce sodium chlorophenyl methylamino butanoate. Furthermore, these may be uptaken into the polymer terminals at the time of the PAS polymerization reaction. The contamination of the metal mold, die, or the like caused by such a compound containing nitrogen atoms has an adverse effect on the quality of the molded product, so the need to frequently clean the metal mold, die, or the like arises.

Accordingly, it is important for the nitrogen content to be reduced in the PAS that is produced.

In this way, it is difficult to efficiently obtain a granular PAS having good thermal stability, low gas production at the time of molding processing, low melt viscosity, and reduced nitrogen content while reducing the halogen content with conventional technology, and there has been a strong demand for improvements.

CITATION LIST

Patent Literature

Patent Document 1: Japanese Unexamined Patent Application Publication No. 2010-126621A
Patent Document 2: Japanese Unexamined Patent Application Publication No. S59-215323A

SUMMARY OF THE INVENTION

Technical Problem

An object of the present invention is to provide a granular PAS having low halogen content, good thermal stability, low gas production at the time of molding processing, and low melt viscosity, and to provide a process for manufacturing a granular PAS, by which the granular PAS described above can be obtained efficiently. That is, an object of the present invention is to obtain, with high yield, a PAS capable of achieving both a low halogen content and a low melt viscosity (high fluidity), wherein these characteristics are stable without fluctuation, and to obtain a PAS with a reduced nitrogen content.

As a result of conducting dedicated research in order to solve the problems described above, the present inventors discovered that, in a granular PAS manufacturing process that induces a liquid-liquid phase separation state in which a produced polymer dense phase and a produced polymer dilute phase are both present in a liquid phase in the presence of a phase separation agent, by performing a polymerization reaction in the presence of a disulfide compound and sifting the produced polymer with a sieve having a specific mesh size so as to produce an oversize fraction, it is possible to recover, with high yield, a granular PAS having a low halogen content, good thermal stability, low gas generation at the time of molding processing, and low melt viscosity.

That is, the present inventors gained the following surprising knowledge about produced PAS as a result of investigating the chlorine content or the like in a PAS filter paper recovery method and a granular recovery method (oversized product of a sieve with a mesh size of 38 µm and a product passing through a sieve with a mesh size of 38 µm) having a melt viscosity within a certain range (3 to 100 Pa·s) measured under conditions at a temperature of 310° C. and a shear rate of 1,200 $sec^{-1}$.

(i) A product passing through a 38 µm sieve or a product recovered with filter paper has an extremely high chlorine content and nitrogen content.

(ii) On the other hand, an oversized product of a 38 µm sieve has a low chlorine content and nitrogen content, and there is a substantial difference relative to a product passing through a 38 µm sieve or a product recovered with filter paper. These findings are at odds with the generally recognized facts, that is, the idea that the chlorine content sequentially increases as the molecular weight decreases due to a proportional increase in the number of PAS molecules, or the number of terminals.

(iii) In addition, due to specific effects such as favorable reactivity in the phase separation state of the disulfide compound, efficiently eliminating most of the low-molecular-weight matter or oligomers in which chlorine bonds to the molecular terminals or the like leads to a further reduction in chlorine content, which makes it possible to recover, with high yield, a granular polymer having good thermal stability and low gas generation at the time of molding processing.

According to the research of the present inventors, it was discovered that since a fine powder serving as an undersize when passed through a sieve by sifting contains a large amount of low-molecular-weight products or oligomers in which chlorine bonds to the molecular terminals, or the like, the undersize fine powder surprisingly has a chlorine content exceeding 20,000 ppm when sifted with a sieve having a mesh size of 38 µm, for example. In contrast, when sifted with a sieve having a mesh size of 38 µm, the chlorine content of the oversize fraction remaining on the sieve without passing through the sieve was lower than 1,500 ppm. Furthermore, when sifted with a sieve having a mesh size of 150 µm, the chlorine content of the oversize fraction remaining on the sieve without passing through the sieve was even smaller than the chlorine content of the oversize fraction remaining on the sieve without passing through the sieve when sifted with a sieve having a mesh size of 38 µm.

That is, with the present invention, by performing a polymerization reaction in the presence of a disulfide compound in the granular PAS manufacturing process of inducing a liquid-liquid phase separation state and sifting the produced polymer with a sieve having a specific mesh size at the time of separation/recovery after polymerization, it is possible to recover, with high yield, a granular PAS having low halogen (low chlorine) content, good thermal stability, low gas generation at the time of molding processing, and low melt viscosity.

In other words, the present invention basically exhibits a substantial effect as a result of combining the following three factors: the induction of a liquid-liquid phase separation state in the polymerization step, the presence of a disulfide compound in the polymerization step, and sifting in the separation/recovery step.

The thermal stability described here can be evaluated with a method of evaluating the thermal stability of a conventional PAS or an ordinary thermoplastic resin. Specific examples are tests using the melt viscosity retention rate at the time of melt (high temperature) retention, an analysis of the thermogravimetric reduction behavior using thermogravimetric analysis (TGA), and color tests using the heat of a polymer. In addition, the gas generated at the time of molding can be evaluated essentially by the amount of mold deposit at the time of injection molding or can be evaluated laboratorially by generated gas analysis.

According to the research of the present inventors, the primary factors allowing the granular PAS of the present invention to have a low halogen content are considered to be as follows. (1) The amount of polymer terminals having halogen was reduced by the strict adjustment of the ratio of the dihalo aromatic compound to the sulfur source. (2) The amount of halogen at the polymer terminals was reduced by sealing the polymer terminals with disulfide compounds. (3) By inducing a liquid-liquid phase separation state during the polymerization step and/or prior to the cooling step, low-molecular-weight products, oligomers, byproduct salt, or the like having a high halogen content were transferred to the thin liquid phase so that they can be easily removed in the separation/recovery step after the polymerization step. (4) The disulfide compound reacted well with the polymer terminals, even in the liquid-liquid phase separation state, so it was possible to efficiently recover granular PAS components having a low halogen content. (5) Low-molecular-weight products, oligomers, and byproduct salt having a high halogen content were efficiently removed by sifting in the separation/recovery step.

Next, the following factor is primarily considered to contribute to the improvement of the thermal stability. (1) The amount of low-molecular-weight products or oligomers having the nitrogen element or the like in the granular polymer was reduced due to the induction of the liquid-liquid phase separation state during the polymerization step and/or prior to the cooling step and sifting in the separation/recovery step. Therefore, the thermal stability was improved.

Next, the following factors are primarily considered to contribute to the fact that the generation of gas at the time of molding processing is low. (1) The melt viscosity of the PAS was reduced so the moldability was improved, and heat degradation did not occur at the time of melt processing. (2) The amount of gas generated at the time of molding processing was reduced as a result of the low amounts of low-molecular-weight products or oligomers having the nitrogen element or the like and the good thermal stability due to the reasons indicated above.

Next, the following factors are considered to contribute to the low melt viscosity. (1) The molecular weight was adjusted by a disulfide compound. (2) The adjustment of the molecular weight was realized by a strict adjustment of the ratio of the dihalo aromatic compound to the sulfur source.

Next, the following are considered to be the primary causes of the improvement in yield. (1) The yield improved due to the adjustment of the ratio of the phase separation agent used to induce a liquid-liquid phase separation state or the strict adjustment of the ratio of water to the sulfur source.

(2) The liquid-liquid phase separation state changed due to the disulfide compound, which improved the efficiency of the separation of low-molecular-weight products and oligomers from high-molecular components and allowed the granular PAS component to be recovered efficiently.

While it was thought that a disulfide compound would not be able to yield the targeted reaction due to a phase separation agent such as water, the present inventors gained the surprising knowledge that a disulfide compound yields the targeted reaction described above, even when the liquid-liquid phase separation state is induced.

In order to obtain the granular PAS of the present invention, it is necessary to optimally select these factors, which are intertwined in a complicated manner, with a good balance.

As described above, the present invention basically exhibits the following such substantial effects as a result of combining the following three factors: the induction of a liquid-liquid phase separation state in the polymerization step, the presence of a disulfide compound in the polymerization step, and sifting in the separation/recovery step.

(i) The reduction of PAS terminal halogen (chlorine) in PAS with a melt viscosity of a certain range measured under conditions at a temperature of 310° C. and a shear rate of 1,200 sec$^{-1}$ using a granular recovered product (mesh size: at least 38 μm (400 mesh)).

(ii) The realization of a reduced melt viscosity (high fluidity).

(iii) The achievement of both a low melt viscosity (high fluidity) and low halogen (chlorine) content.

(iv) The control of the phase separation state with a disulfide compound in the polymerization step.

(v) A marked improvement in the yield of the granular recovered product (oversize fraction using a sieve with a mesh size of at least 38 μm (400 mesh)).

In the present invention, granulation is achieved by the induction of a liquid-liquid phase separation state caused by the presence of a phase separation agent and solidification by cooling from the liquid-liquid phase separation state in the latter half of the polymerization step, at the time of the completion of polymerization, or in the early stages of cooling. As a result, it becomes possible to recover a granular PAS with a sieve having a mesh size of at least 38 μm (400 mesh).

This yields a marked difference in the chlorine content between a granular product obtained using a sieve having a mesh size of at least 38 μm and fine powder smaller than such a granular product.

In addition, a granular product obtained using a sieve having a mesh size of at least 38 μm can be recovered with high yield from a polymer dense phase due to the effects of favorable reactivity in the phase separation state when a disulfide compound is added.

The present invention was completed based on this knowledge.

Solution to Problem

The present invention provides a granular PAS;
(i) the granular PAS containing an —S— substituent at a terminal, the —S— substituent being formed by cleavage of a disulfide compound;
(ii) the granular PAS being an oversize fraction after sifting with a sieve having a mesh size of at least 38 μm;
(iii) the granular PAS having a halogen content of at most 1,500 ppm; and (iv) the granular PAS being a granular PAS having a melt viscosity of 3 to 100 Pa·s when measured under conditions at a temperature of 310° C. and a shear rate of 1,200 sec$^{-1}$.

In addition, the present invention provides a process for manufacturing the above-described granular PAS comprising the steps of: polymerizing a sulfur source and a dihalo aromatic compound in an organic amide solvent; cooling a liquid phase containing a produced polymer after the polymerization step; separating and recovering the produced polymer; and inducing a liquid-liquid phase separation state in which a produced polymer dense phase and a produced polymer dilute phase are both present in the presence of a phase separation agent during the polymerization step and/or prior to the cooling step;
(i) the polymerization reaction being performed in the presence of a disulfide compound in the polymerization step; and
(ii) an oversize fraction being obtained by sifting the produced polymer with a sieve having a mesh size of at least 38 μm in the separation/recovery step.

Advantageous Effects of Invention

With the present invention, it is possible to obtain, with high yield, a granular PAS having good thermal stability, low gas generation at the time of molding processing, low halogen content, low melt viscosity, and a highly balanced combination of these characteristics. In addition, with the present invention, it is possible to obtain a granular PAS with reduced nitrogen content. The granular PAS of the present invention having a low halogen (low chlorine) content, good thermal stability, low gas generation at the time of molding processing, and low melt viscosity is useful as a PAS with a low halogen (low chlorine) content and a low melt viscosity that has been in particularly high demand in the field of electrical/electronic equipment in recent years.

BRIEF DESCRIPTION OF THE DRAWING

FIG. 1 is a graph plotting the chlorine content and melt viscosity of oversize fractions using a sieve with a mesh size of 150 μm in Working Examples 1 to 4 and Comparative Examples 1, 6, and 7.

DESCRIPTION OF EMBODIMENTS

1. Raw Materials 1-1. Sulfur Source

In the present invention, at least one type of sulfur source selected from the group consisting of alkali metal sulfides and alkali metal hydrosulfides is used as a sulfur source. Examples of alkali metal sulfides include lithium sulfide, sodium sulfide, potassium sulfide, dirubidium sulfide, cesium sulfide, mixtures of two or more types thereof, and the like. Examples of alkali metal hydrosulfides include lithium hydrosulfide, sodium hydrosulfide, potassium hydrosulfide, rubidium hydrosulfide, cesium hydrosulfide, mixtures of two or more types thereof, and the like.

The alkali metal sulfide that is used may be an anhydride, a hydrate, or an aqueous solution. Of these, sodium sulfide and lithium sulfide are preferable in that they can be procured inexpensively on an industrial scale. From the perspectives of treatment operations, measurements, and the like, it is preferable to use the alkali metal sulfide as an aqueous mixture such as an aqueous solution (that is, a mixture with water, which has fluidity).

The alkali metal hydrosulfide that is used may be an anhydride, a hydrate, or an aqueous solution. Of these, sodium hydrosulfide and lithium hydrosulfide are preferable in that they can be procured inexpensively on an industrial scale. From the perspectives of treatment operations, measurements, and the like, it is preferable to use the alkali metal hydrosulfide as an aqueous mixture such as an aqueous solution (that is, a mixture with water, which has fluidity).

In the production process of an alkali metal sulfide, a small amount of an alkali metal hydrosulfide is typically produced as a byproduct. The alkali metal sulfide used in the present invention may contain a small amount of an alkali metal hydrosulfide. In this case, the total molar amount of the alkali metal sulfide and the alkali metal hydrosulfide serves as the charged sulfur source in the charging step after the dehydration step described below.

On the other hand, in the production process of an alkali metal hydrosulfide, a small amount of an alkali metal sulfide is typically produced as a byproduct. The alkali metal hydrosulfide used in the present invention may contain a small amount of an alkali metal sulfide. In this case, the total molar amount of the alkali metal hydrosulfide and the alkali metal sulfide serves as the charged sulfur source in the charging step after the dehydration step. When an alkali metal sulfide and an alkali metal hydrosulfide are used as a mixture, the mixture of the two components serves as the charged sulfur source.

When the sulfur source contains an alkali metal hydrosulfide, an alkali metal hydroxide is used in combination. Examples of alkali metal hydroxides include lithium hydroxide, sodium hydroxide, potassium hydroxide, rubidium hydroxide, cesium hydroxide, mixtures of two or more types thereof, and the like. Of these, sodium hydroxide and lithium hydroxide are preferable in that they can be procured inexpensively on an industrial scale. The alkali metal hydroxide is preferably used as an aqueous mixture such as an aqueous solution.

1-2. Dihalo Aromatic Compound

The dihalo aromatic compound used in the present invention is a dihalogenated aromatic compound having two halogen atoms directly bonded to an aromatic ring. Specific examples of dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, dihalodiphenyl ketone, and the like.

Here, halogen atoms refer to the respective atoms of fluorine, chlorine, bromine, and iodine, and the two halogen atoms may be the same or different in the same dihalo aromatic compound. Of these halogen atoms, chlorine atoms are preferable. These dihalo aromatic compounds may each be used alone or in a combination of two or more types thereof. Generally, p-dichlorobenzene (p-DCB) is used frequently.

The charged amount of the dihalo aromatic compound is typically from 1.005 to 1.040 mol, preferably from 1.008 to 1.035 mol, more preferably from 1.010 to 1.030 mol, and particularly preferably from 1.012 to 1.028 mol per 1 mol of the charged sulfur source.

When the charged amount of the dihalo aromatic compound is too small, decomposition reactions tend to occur, whereas when the amount is too large, it becomes difficult to adjust the melt viscosity of the PAS, and the halogen content increases. Strict adjustment of this ratio is necessary in order to obtain a PAS with a low halogen content.

1-3. Branching/Crosslinking Agent and Molecular Weight Controlling Agent

In order to introduce a branched or crosslinked structure into the PAS, it is possible to use a combination of a polyhalide compound to which three or more halogen atoms are bonded (not necessarily an aromatic compound), an active hydrogen-containing halogenated aromatic compound, a halogenated aromatic nitro compound, or the like. A preferable example of a polyhalide compound serving as a branching/crosslinking agent is trihalobenzene.

In order to control the molecular weight or terminal groups of the PAS, a monohalo organic compound may be added at any stage of the polymerization step. Examples of monohalo organic compounds include monohalo-substituted saturated or unsaturated aliphatic hydrocarbons such as monohalopropane, monohalobutane, monohaloheptane, monohalohexane, aryl halide, and chloroprene; monohalo-substituted saturated cyclic hydrocarbons such as monohalocyclohexane and monohalodecalin; and monohalo-substituted aromatic hydrocarbons such as monohalobenzene, monohalonaphthalene, 4-chlorobenzoic acid, methyl 4-chlorobenzoate, 4-chlorodiphenyl sulfone, 4-chlorobenzonitrile, 4-chlorobenzotrifluoride, 4-chloronitrobenzene, 4-chloroacetophenone, 4-chlorobenzophenone, and benzyl chloride; and the like.

The halogen atoms refer to the respective atoms of fluorine, chlorine, bromine, and iodine. Of these halogen atoms, chlorine atoms are preferable. In addition, organic compounds in which one of the chlorine atoms is substituted, the organic compounds having substituents such as trifluoromethane with a much lower reactivity than the chlorine atoms, are also included in the monohalo organic compounds for the sake of convenience.

1-4. Organic Amide Solvent

In the present invention, an organic amide solvent, which is an aprotic polar organic solvent, is used as a solvent for the dehydration reaction and the polymerization reaction. The organic amide solvent is preferably stable with respect to alkalis at high temperatures.

Specific examples of organic amide solvents include amide compounds such as N,N-dimethylformamide and N,N-dimethylacetamide; N-alkyl caprolactam compounds such as N-methyl-ε-caprolactam; N-alkyl pyrrolidone compounds or N-cycloalkyl pyrrolidone compounds such as N-methyl-2-pyrrolidone and N-cyclohexyl-2-pyrrolidone; N,N-dialkyl imidazolidinone compounds such as 1,3-dialkyl-2-imidazolidinone; tetraalkyl urea compounds such as tetramethyl urea; and hexaalkyl phosphoric acid triamide compounds such as hexamethyl phosphoric acid triamide; and the like. These organic amide solvents may each be used alone or in a combination of two or more types thereof.

Of these organic amide solvents, N-alkyl pyrrolidone compounds, N-cycloalkyl pyrrolidone compounds, N-alkyl caprolactam compounds, and N,N-dialkyl imidazolidinone compounds are preferable, and N-methyl-2-pyrrolidone, N-methyl-ε-caprolactam, and 1,3-dialkyl-2-imidazolidinone are particularly preferably used. The amount of the organic amide solvent used in the polymerization reaction of the present invention is ordinarily in a range of 0.1 to 10 kg and preferably in a range of 0.15 to 5 kg per 1 mol of the sulfur source. When the amount of the organic amide solvent used is less than 0.1 kg, it is difficult to stably perform the polymerization reaction, and when the amount exceeds 10 kg, there are problems such as increases in the manufacturing cost.

1-5. Phase Separation Agent

In the present invention, various phase separation agents can be used in order to induce a liquid-liquid phase separation state so as to obtain a PAS with an adjusted melt viscosity in a short amount of time with a low halogen content. A phase separation agent is a compound having an action of dissolving in an organic amide solvent so as to reduce the solubility of the PAS in the organic amide solvent by itself or in the presence of a small amount of water. The phase separation agent itself is a compound that is not a solvent of the PAS.

A compound that is publicly known as a phase separation agent of PAS can be typically used as the phase separation agent. Specific examples of phase separation agents include water, organic carboxylic acid metal salts such as alkali metal carboxylic acid salts, organic sulfonic acid metal salts, alkali metal halides such as lithium halide, alkali earth metal halides, alkali earth metal salts of aromatic carboxylic acids, phosphoric acid alkali metal salts, alcohols, and paraffin hydrocarbons, and the like. These phase separation agents may each be used alone or in a combination of two or more types thereof. Of these, water and organic carboxylic acid metal salts are preferable in that they are inexpensive. An aqueous solution is preferable when organic carboxylic acid metal salts, organic sulfonic acid metal salts, alkali metal halides such as lithium halide, alkali earth metal halides, alkali earth metal salts of aromatic carboxylic acids, phosphoric acid alkali metal salts, and the like are used. Water is particularly preferable as a phase separation agent. Of organic carboxylic acid metal salts, sodium acetate is preferable, and this may typically be used as an aqueous solution of 25 to 35 mass % and preferably 30 mass %. The amount of the phase separation agent that is used differs depending on the type of compound used, but the amount is typically in a range of 0.01 to 15 mol per 1 mol of the charged sulfur source. The amount is preferably 0.01 to 13 mol, more preferably 0.02 to 12 mol, and particularly preferably 0.03 to 10 mol. When the amount of the phase separation agent that is used is less than 0.01 mol, it is difficult to induce a liquid-liquid phase separation state, and when the amount exceeds 15 mol, it becomes difficult to favorably advance the polymerization reaction.

In the present invention, the phase separation agent may be present during the polymerization step and/or prior to the cooling step described below, which makes it possible to obtain a step of inducing a liquid-liquid phase separation state.

1-6. Disulfide Compound

In the present invention, the polymerization reaction in the polymerization step is performed in the presence of a disulfide compound. The disulfide compound may be added at any stage of the polymerization step. For example, when the polymerization step includes a two-stage process comprising a pre-stage polymerization step and a post-stage polymerization step, the disulfide compound may be added in the pre-stage polymerization step or in the post-stage polymerization step. In addition, the disulfide compound may also be added at the time that the pre-stage polymerization step is begun, that is, at the time of the charging step.

The disulfide compound has an —S—S— portion, so an —S— substituent formed by the cleavage of the disulfide compound is substituted for halogen groups (chlorine groups) at the terminals of the produced PAS, which is presumed to fulfill the role of reducing the halogen content of the PAS. For example, when the disulfide compound is diphenyl disulfide, the PAS terminals contains —S—$C_6H_5$ which has reacted with the terminals.

That is, when the disulfide compound is diphenyl disulfide and the dihalo aromatic compound is dihalobenzene, for example, most of the terminal group components of the PAS terminals are formed from —Cl, —S—$C_6H_5$ which is a reacted disulfide compound, —SH, and nitrogen compounds derived from the organic amide solvent. An analysis of these terminal end components can be performed quantitatively or qualitatively by elemental analysis, high-temperature NMR analysis, or IR analysis. In addition, as a specific example of these assay methods, it is possible to calculate the amount of —S—$C_6H_5$, which is a reacted disulfide compound, by assaying —Cl by elemental analysis, assaying —SH by a titration, a derivative reaction, or an IR method, or analyzing the nitrogen of nitrogen compounds derived from the organic amide solvent.

Furthermore, in contrast to water-soluble thiophenols, disulfide compounds are insoluble in water. Therefore, when in the liquid-liquid phase separation state, in particular, the disulfide compound is distributed over the polymer dense phase having a low water content and is efficiently substituted for the halogen of the PAS terminals, which may contribute to the reduction in the amount of halogen. Furthermore, surprisingly, the disulfide compound exhibits advantageous effects such as favorable reactivity even in the liquid-liquid phase separation state. That is, the fact that the reactivity of the disulfide compound is favorably expressed in the liquid-liquid phase separation state is also a feature of the present invention.

In addition, the timing at which the disulfide compound is added may be determined based on the conversion ratio of the dihalo aromatic compound. Specifically, the disulfide compound can be added at a point when the conversion ratio of the dihalo aromatic compound is from 0 to 100%, ordinarily at least 45%, preferably from 45 to 99.5%, more preferably from 60 to 99%, even more preferably from 70 to 98.5%, and particularly preferably from 80 to 98% in the polymerization step, and the compound can be present during the polymerization step.

Examples of disulfide compounds include diphenyl disulfide (DPDS), p-p'-ditolyl disulfide, dibenzyl disulfide, dibenzoyl disulfide, and dithiobenzoyl disulfide, and diphenyl disulfide is preferable.

During the polymerization step, the amount of the disulfide compound that is added when the polymerization reaction is performed in the presence of the disulfide compound is from 0.0005 to 0.015 mol, preferably from 0.0007 to 0.01 mol, more preferably from 0.0008 to 0.008 mol, even more preferably from 0.0009 to 0.006 mol, and particularly preferably from 0.001 to 0.005 mol per 1 mol of the charged sulfur source.

Regulating the added amount of the disulfide compound to this range is important for obtaining a granular PAS having good thermal stability, low gas generation at the time of molding processing, low halogen content, low melt viscosity, and highly balanced performance.

2. Manufacturing Process

The manufacturing process comprises: a polymerization step of polymerizing a sulfur source and a dihalo aromatic compound in an organic amide solvent; a cooling step of cooling a liquid phase containing a produced polymer after the polymerization step; a separation/recovery step of separating and recovering the produced polymer; and a step of inducing a liquid-liquid phase separation state in which a produced polymer dense phase and a produced polymer dilute phase are both present in the presence of a phase separation agent during the polymerization step and/or prior to the cooling step.

In addition, the polymerization step may also include a phase separation polymerization step of continuing the polymerization reaction in a liquid-liquid phase separation state in which the produced polymer dense phase and the produced polymer dilute phase are both present in the liquid phase in the polymerization reaction system in the presence of a phase separation agent.

2-1. Dehydration Step

As a preliminary step of the polymerization step, it is preferable to adjust the amount of coexisting water (also called the water content) in the reaction system by establishing a dehydration step. The dehydration step is preferably performed by a method of heating and reacting a mixture containing an organic amide solvent and an alkali metal sulfide in an inert gas atmosphere and discharging the water to the outside of the system by distillation. When an alkali metal hydrosulfide is used as the sulfur source, this step is performed by a method of heating and reacting a mixture containing an alkali metal hydrosulfide and an alkali metal hydroxide and discharging the water to the outside of the system by distillation.

In the dehydration step, the water content comprising hydrated water (crystallization water) or an aqueous medium, byproduct water, or the like is preferably dehydrated until the water content is in a range of the amount of coexisting water required in the charging step described below. When the amount of coexisting water is outside the range required in the charging step, the shortage of water should be additionally added.

When an alkali metal hydrosulfide is used as the sulfur source, it is preferable to heat and react a mixture containing an organic amide solvent, an alkali metal hydrosulfide, and from 0.95 to 1.07 mol of an alkali metal hydroxide per 1 mol of the alkali metal hydrosulfide in the dehydration step and to discharge at least part of the distillate containing water from the inside of the system containing the mixture to the outside of the system.

When the molar amount of the alkali metal hydroxide per 1 mol of the charged alkali metal hydrosulfide in this step is too small, the amount of the sulfur compound (hydrogen sulfide) volatilized in the dehydration step becomes large, which leads to a decrease in productivity due to a reduction in the amount of charged sulfur or tends to cause an abnormal reaction or a decrease in the quality of the PAS due to an increase in the polysulfurized components in the charged sulfur source remaining after dehydration. When the molar amount of the alkali metal hydroxide per 1 mol of the charged alkali metal hydrosulfide is too large, the deterioration of the organic amide solvent may be increased, or it may become difficult to stably perform the polymerization reaction, thus causing a decrease in the yield or quality of the PAS. A preferable molar amount of the alkali metal hydroxide per 1 mol of the charged alkali metal hydrosulfide in this step is from 0.96 to 1.06 mol, and more preferably from 0.97 to 1.05 mol.

In many cases, the alkali metal hydrosulfide contains a small amount of an alkali metal sulfide, and the amount of the sulfur source is the total amount of the sulfur source of the alkali metal hydrosulfide and the alkali metal sulfide. Even if the alkali metal hydrosulfide contains an alkali metal sulfide, there is no problem with using the alkali metal hydrosulfide as a raw material for a PAS, but the content is preferably as small as possible in order to produce the granular PAS of the present invention. In addition, in the present invention, even if a small amount of an alkali metal sulfide is contained, the molar amount of the alkali metal hydroxide is calculated based on the content (analytical value) of the alkali metal hydrosulfide, and the molar amount is adjusted.

The loading order of the raw materials in the dehydration step may be any order, and each raw material may also be additionally loaded at an intermediate stage of the dehydration step. An organic amide solvent is used as the solvent used in the dehydration step. This solvent is preferably the same as the organic amide solvent used in the polymerization step, and N-methyl-2-pyrrolidone is particularly preferable. The amount of the organic amide solvent that is used is typically from 0.1 to 10 kg and preferably from 0.15 to 5 kg per 1 mol of the sulfur source loaded into the reaction vessel.

The dehydration operation is performed by heating the mixture formed by adding the raw materials to the reaction vessel typically at a temperature of 300° C. or lower and preferably within the temperature range of 100 to 250° C., typically for 15 minutes to 24 hours and preferably for 30 minutes to 10 hours. The heating method may be a method of maintaining a constant temperature, a method of increasing the temperature stepwise or continuously, or a method combining the two methods described above. The dehydration step is performed in a batch process, a continuous process, or a combination of both processes.

The apparatus for performing the dehydration step may be the same as or different than the reaction vessel used in the polymerization step described below. The material of the apparatus is preferably a corrosion resistant material such as titanium. In the dehydration step, part of the organic amide solvent is typically discharged to the outside of the reaction vessel together with the water. At this time, hydrogen sulfide is discharged to the outside of the system as a gas.

2-2. Charging Step

In the "manufacturing process comprising the steps of: polymerizing a sulfur source and a dihalo aromatic compound in an organic amide solvent; cooling a liquid phase containing a produced polymer after the polymerization step; separating and recovering the produced polymer; and inducing a liquid-liquid phase separation state in which a produced polymer dense phase and a produced polymer dilute phase are both present in the presence of a phase separation agent during the polymerization step and/or prior to the cooling step" of the present invention, the charging step is a step of adjusting amount of the phase separation agent with respect to the charged sulfur source, the amount of coexisting water with respect to the charged sulfur source, the amount of the dihalo aromatic compound with respect to the charged sulfur source, the amount of the alkali metal hydroxide with respect to the charged sulfur source, the amount of the disulfide compound with respect to the charged sulfur source, and the like as required in the polymerization step.

The charged sulfur source refers to a sulfur source which reacts with the dihalo aromatic compound in the polymerization step (also called an "effective sulfur source"). A dehydration step is typically provided in a PAS manufacturing process, so the amount of the charged sulfur source is generally calculated from the formula: [charged sulfur source]=[total molar amount of charged sulfur]−[amount of volatilized sulfur after dehydration].

When hydrogen sulfide is volatilized in the dehydration step, an alkali metal hydroxide is produced due to an equilibrium reaction, and this compound remains inside the system. Accordingly, it is necessary to determine the molar amount of the alkali metal hydroxide with respect to the sulfur source in the charging step upon gaining an accurate grasp of the amount of volatilized hydrogen sulfide. In the present invention, an alkali metal hydroxide and water can be added as necessary to the mixture remaining inside the system after the dehydration step.

The amount of coexisting water at the time that the polymerization reaction is begun is typically in a range of 0.02 to 2 mol, preferably 0.05 to 1.9 mol, and more preferably 0.5 to 1.8 mol per 1 mol of the charged sulfur source in the charging step. When the amount is within this range, the amount of coexisting water can be increased at an intermediate stage of the polymerization reaction.

The charged amount of the dihalo aromatic compound is typically from 1.005 to 1.040 mol, preferably from 1.008 to 1.035 mol, more preferably from 1.010 to 1.030 mol, and particularly preferably from 1.012 to 1.028 mol per 1 mol of the charged sulfur source.

When an alkali metal hydrosulfide is used, the amount of the alkali metal hydroxide per 1 mol of the charged sulfur source is preferably from 1.005 to 1.080 mol, more preferably from 1.010 to 1.075 mol, and particularly preferably from 1.020 to 1.073 mol. Performing the polymerization reaction in a state in which there is a slight excess of the alkali metal hydroxide is preferable from the perspective of obtaining a high-quality PAS by stably performing the polymerization reaction.

During the polymerization step, the amount of the disulfide compound that is added when the polymerization reaction is performed in the presence of the disulfide compound is from 0.0005 to 0.015 mol, preferably from 0.0007 to 0.01 mol, more preferably from 0.0008 to 0.008 mol, even more preferably from 0.0009 to 0.006 mol, and particularly preferably from 0.001 to 0.005 mol per 1 mol of the charged sulfur source.

The disulfide compound may be added alone or as a mixture with the organic amide solvent during the polymerization step.

The amount of the organic amide solvent is from 0.1 to 10 kg and preferably from 0.15 to 5 kg per 1 mol of the sulfur source or the charged sulfur source.

2-3. Polymerization Step

The polymerization step is performed by heating the sulfur source and the dihalo aromatic compound in the organic amide solvent. The polymerization step preferably includes a phase separation polymerization step of continuing the polymerization reaction in a liquid-liquid phase separation state in which the produced polymer dense phase and the produced polymer dilute phase are both present in the liquid phase in the polymerization reaction system in the presence of a phase separation agent.

In addition, a liquid-liquid phase separation state in which a produced polymer dense phase and a produced polymer dilute phase are both present in the liquid phase inside the polymerization reaction system after polymerization in the presence of a phase separation agent may also be induced. That is, the phase separation agent may be added prior to the cooling step after the polymerization reaction.

Next, the granular PAS is separated and recovered by cooling the liquid phase containing the produced polymer in the liquid-liquid phase separation state.

The phase separation agent is at least one type of a phase separation agent selected from the group consisting of water, organic carboxylic acid metal salts, organic sulfonic acid metal salts, alkali metal halides, alkali earth metal halides, alkali earth metal salts of aromatic carboxylic acids, phosphoric acid alkali metal salts, alcohols, and paraffin hydrocarbons.

The amount of the phase separation agent that is used is typically from 0.01 to 15 mol, preferably from 0.01 to 13 mol, more preferably from 0.02 to 12 mol, and particularly preferably from 0.03 to 10 mol per 1 mol of the charged sulfur source.

The polymerization reaction needs to be performed in the presence of a disulfide compound at some stage of the polymerization step. The polymerization reaction in the polymerization step needs to be performed in the presence of a disulfide compound at a concentration of 0.0005 to 0.015 mol, preferably 0.0007 to 0.01 mol, more preferably 0.0008 to 0.008 mol, even more preferably 0.0009 to 0.006 mol, and particularly preferably 0.001 to 0.005 mol per 1 mol of the charged sulfur source.

In order to obtain a PAS with a melt viscosity within a certain range, it is preferable to add a disulfide compound so that the conversion ratio of the dihalo aromatic compound is at least 45%. In addition, a polymerization assisting agent or other additives may be mixed into the compound prior to or during the polymerization step.

The polymerization reaction is typically preferably performed with a two-stage process comprising a pre-stage polymerization step and a post-stage polymerization step in a range of 170 to 290° C. The heating method that is used is a method of maintaining a constant temperature, a method of increasing the temperature stepwise or continuously, or a method combining the two methods described above. The polymerization reaction time is typically in a range of 10 minutes to 72 hours and preferably 30 minutes to 48 hours. The amount of the organic amide solvent used in the polymerization step is typically from 0.1 to 10 kg and preferably from 0.15 to 5 kg per 1 mol of the charged sulfur source. As long as the amount is within this range, the amount may be varied at an intermediate stage of the polymerization reaction.

It is preferable to use a method in which, at a stage when the conversion ratio of the dihalo aromatic compound reaches 80 to 99 mol % after the polymerization reaction is begun, the liquid phase inside the polymerization reaction system is converted to a phase separation state, and the polymerization reaction is then continued. In order to convert a liquid phase in a high-temperature state to the phase separation state, it is preferable to add a phase separation agent or increase the amount of an additive acting as a phase separation agent. The phase separation agent is not particularly limited; however, from the perspective that the materials are inexpensive and that the control of the polymerization and post-processing are simple, water, an organic carboxylic acid metal salt, or a combination thereof are preferable, and water is particularly preferable.

In the manufacturing process of the present invention, the polymerization reaction is performed in the presence of a disulfide compound, and the polymerization step is preferably performed with at least the following two-stage process:

(I) a pre-stage polymerization step of subjecting a sulfur source and a dihalo aromatic compound to a polymerization reaction at a temperature of 170 to 270° C. in an organic amide solvent in the presence of 0.02 to 2 mol of coexisting water and 1.005 to 1.040 mol of a dihalo aromatic compound per 1 mol of the charged sulfur source so as to produce a polymer with an 80 to 99% conversion ratio of the dihalo aromatic compound; and (II) a post-stage polymerization step of converting the liquid phase inside the polymerization reaction system to the phase separation state by heating the mixture to a temperature of 240 to 290° C. in the presence of a phase separation agent at a concentration in a range of 0.01 to 10 mol per 1 mol of the charged sulfur source and then continuing the polymerization reaction.

2-3-1. Pre-Stage Polymerization Step

The amount of coexisting water of the reaction system in the pre-stage polymerization step is in a range of 0.02 to 2 mol, preferably 0.05 to 1.9 mol, and more preferably 0.5 to 1.8 mol per 1 mol of the charged sulfur source. When the amount of coexisting water is too small, undesirable reactions such as the decomposition of the PAS tend to occur. Conversely, when the amount exceeds 2 mol, the polymerization rate dramatically decreases and decomposition of the organic amide solvent or the produced PAS tends to occur, so neither situation is preferable. The charged amount of the dihalo aromatic compound is typically from 1.005 to 1.040 mol, preferably from 1.008 to 1.035 mol, more preferably from 1.010 to 1.030 mol, and particularly preferably from 1.012 to 1.028 mol per 1 mol of the charged sulfur source.

Polymerization is performed within the temperature range of 170 to 270° C. and preferably 180 to 265° C. When the polymerization temperature is too low, the polymerization rate is too slow. Conversely, when the temperature is a high temperature exceeding 270° C., the produced PAS and the organic amide solvent tend to be decomposed, and the degree of polymerization of the produced PAS becomes very low. In order to obtain a PAS having an adjusted melt viscosity at a low halogen content, it is preferable to control the polymerization temperature in the pre-stage polymerization step in a range of 200 to 255° C.

The pre-stage polymerization step is a stage at which the conversion ratio of the dihalo aromatic compound reaches 80 to 99%, preferably 85 to 98%, and more preferably 90 to 97% after the polymerization reaction started and is the step prior to when the liquid phase enters the phase separation state. The amount of the dihalo aromatic compound remaining in the reaction mixture is determined by gas chromatography, and the conversion ratio of the dihalo aromatic compound is a value calculated from the following formula based on this remaining amount, the charged amount of the dihalo aromatic compound, and the charged amount of the sulfur source.

When the dihalo aromatic compound (abbreviated as "DHA") is added in a greater molar amount than the sulfur source, the conversion ratio is calculated using the following formula:

conversion ratio=[(DHA charged amount (mol)−DHA remaining amount (mol))/(DHA charged amount (mol)−DHA excess amount (mol))]×100

In other cases, the conversion ratio is calculated using the following formula:

conversion ratio=[(DHA charged amount (mol)−DHA remaining amount (mol))/(DHA charged amount (mol))]×100

In the pre-stage polymerization step of the manufacturing process described above, it is typically preferable to produce a polymer (also called a "prepolymer") having a melt viscosity of 0.5 to 30 Pa·s when measured at a temperature of 310° C. and a shear rate of 1,200 sec$^{-1}$.

The phase separation state does not appear in the pre-stage polymerization step. In the post-stage polymerization step after the phase separation agent is added, the liquid phase inside the polymerization reaction system is phase-separated into a polymer dense phase in which the content of the polymer (prepolymer) produced by pre-stage polymerization is large and a polymer dilute phase in which the content of this polymer is small. The phase separation state can be clearly observed visually.

2-3-2. Post-Stage Polymerization Step

The amount of the phase separation agent that is used in the post-stage polymerization step is typically from 0.01 to 10 mol, preferably from 0.03 to 8 mol, and more preferably from 0.04 to 7 mol per 1 mol of the charged sulfur source.

When water is used as a phase separation agent in the post-stage polymerization step, the amount of coexisting water in the reaction system in the post-stage polymerization step is typically adjusted to the range of 2 to 5 mol, preferably 2.1 to 4.5 mol, even more preferably 2.2 to 4 mol, and particularly preferably 2.3 to 3.5 mol per 1 mol of the charged sulfur source. When the amount of coexisting water in the reaction system is less than 2 mol or exceeds 5 mol, the degree of polymerization of the produced PAS decreases.

When a phase separation agent other than water (at least one type of phase separation agent selected from the group consisting of organic carboxylic acid metal salts, organic sulfonic acid metal salts, alkali metal halides, alkali earth metal halides, alkali earth metal salts of aromatic carboxylic acids, phosphoric acid alkali metal salts, alcohols, and paraffin hydrocarbons) is used as the phase separation agent in the post-stage polymerization step, the phase separation agent is preferably present in the amount in a range of 0.01 to 3 mol, preferably 0.02 to 2 mol, more preferably 0.03 to 1 mol, and particularly preferably 0.04 to 0.5 mol per 1 mol of the charged sulfur source.

Another phase separation agent other than water can be used in combination with water as the phase separation agent. In this aspect, the amount of coexisting water in the reaction system is from 0.01 to 7 mol, preferably from 0.1 to 4 mol, and more preferably from 1 to 3.5 mol per 1 mol of the charged sulfur source, and the other phase separation agent other than water is preferably present in a range of 0.01 to 3 mol, preferably 0.02 to 1 mol, and more preferably 0.03 to 0.5 mol per 1 mol of the charged sulfur source. The strict adjustment of the ratio of the phase separation agent and the charged sulfur source leads to a reduction in low-molecular-weight products and oligomers.

The polymerization temperature in the post-stage polymerization step is in a range of 240 to 290° C. When the polymerization temperature in the post-stage polymerization step is less than 240° C., it becomes difficult to obtain a PAS with an adjusted melt viscosity, and when the temperature exceeds 290° C., there is a risk that the produced PAS or the organic amide solvent may decompose. The temperature range is even more preferably in a range of 245 to 280° C. and particularly preferably 250 to 275° C. in that it is easy to obtain a PAS with an adjusted melt viscosity. The post-stage polymerization step of the present invention is not simply a step of classifying and granulating the PAS prepolymer produced in the pre-stage polymerization step, but is for inducing an increase in the degree of polymerization of the PAS prepolymer.

In the post-stage polymerization step, the polymerization reaction is continued in a phase separation state in which the produced polymer dense phase and the produced polymer dilute phase are both present in the liquid phase in the polymerization reaction system in the presence of a phase separation agent. The PAS concentration of the dense phase is typically from 30 to 70 mass %, preferably from 40 to 60 mass %, and more preferably from 45 to 55 mass %. The PAS concentration of the dilute phase is typically from 0.1 to 15 mass %, preferably from 0.5 to 10 mass %, and more preferably from 1 to 8 mass %.

When a liquid-liquid phase separation state in which the produced polymer dense phase and the produced polymer dilute phase are both present in the liquid phase in the polymerization reaction system in the presence of a phase separation agent is induced, the produced polymer dense phase is dispersed into the produced polymer dilute phase by stirring, and condensation reaction between the prepolymers progress efficiently in the dense phase.

The polymer reaction method may be a batch process, a continuous process, or a combination of both processes. In batch polymerization, a process in which two or more reaction vessels are used may be employed as necessary for the purpose of reducing the polymerization cycle time.

2-4. Cooling Step

In the present invention, a liquid-liquid phase separation state in which the produced polymer dense phase and the produced polymer dilute phase are both present is induced in the presence of the phase separation agent described above after the polymerization step and prior to the cooling step. If necessary, the induction of the liquid-liquid phase separation state can be adjusted by stirring.

In the cooling step, a liquid phase containing the produced polymer is generally cooled from a high-temperature state after the polymerization step. In the cooling step, the liquid phase is not rapidly cooled by the flushing or the like of a solvent, but gradually cooling the liquid phase is preferable in that it becomes easy to obtain a granulated polymer. In gradual cooling, it is preferable to cool the liquid phase while controlling the cooling rate to 2.0 to 0.1° C./min. Gradual cooling can be performed by a method of exposing the polymerization reaction system to the ambient environment temperature (for example, room temperature). In order to control the cooling rate of the liquid phase, it is also possible to employ a method of feeding a cooling medium into a jacket of the polymerization reaction vessel or refluxing the liquid phase with a reflux condenser.

In the manufacturing process of the present invention, it is preferable to gradually cool the liquid phase by controlling the cooling rate to 2.0 to 0.1° C./min, more preferably 1.5 to 0.2° C./min, and even more preferably 1.3 to 0.3° C./min until the temperature of the liquid phase in the polymerization reaction system falls to the polymerization temperature of the liquid-liquid phase separation polymerization step or the temperature at which the PAS is solidified and granulated from the liquid-liquid phase separation state or less (for example, approximately 240 to approximately 200° C.) (hereafter abbreviated as the "solidification/granulation temperature"). The granulation of the polymer can be accelerated by such control of the cooling rate. For example, the liquid phase can be cooled from approximately 240 to 200° C., for example, to a desired temperature without controlling the temperature. For example, from approximately 240 to 200° C., the polymerization reaction system can be left at the ambient environment temperature, or the cooling rate of the liquid phase can be increased. The final cooling temperature is set to a temperature of at least room temperature and less than 220° C., at which the separation and recovery step for sifting or the like can be performed easily. In order to obtain a granular PAS having good thermal stability, low gas generation at the time of molding processing, low halogen content, low melt viscosity, and highly balanced performance, the temperature is preferably set to at least 35° C., more preferably at least 40° C., and even more preferably at least 45° C. It is preferable to set the upper limit temperature to at most 200° C. and to set the washing temperature to less than 100° C. so that a slurry containing a sufficiently granulated PAS can be obtained.

2-5. Separation/Recovery Step

With the manufacturing process of the present invention, it is possible to produce a granular PAS, so a method of separating and recovering the granular PAS from the reaction solution with a method of sifting the substance using a sieve having a prescribed mesh size is employed. Sifting may be performed while the product slurry is in the high-temperature state (for example, a temperature of at least room temperature and less than 220° C.). In the manufacturing process of the present invention, the produced PAS is sifted with a sieve having a mesh size of at least 38 μm and recovered as an oversize fraction after sifting. Sifting may be performed after washing or after drying as described below. In addition, sifting may also be performed at least stage prior to washing, after washing, and after drying.

Next, washing and filtration are repeated in accordance with conventional methods. For example, it is preferable to wash the PAS with an organic solvent such as the same organic amide solvent as the polymerization solvent, a ketone (for example, acetone), or an alcohol (for example, methanol). The PAS may also be washed with hot water or the like. The produced PAS can also be treated with a salt of an organic acid or aluminum chloride. Acetic acid is preferably used as the organic acid. After washing, the PAS is dried in accordance with a conventional method.

The granular PAS is an oversize fraction after sifting with a sieve having a mesh size of at least 38 μm. The sieve used to recover the granular PAS is typically a sieve having a mesh size selected from the range of 38 μm to 2,800 μm, preferably a sieve having a mesh size selected from the range of 38 μm to 1,500 μm, more preferably a sieve having a mesh size selected from the range of 38 μm to 1,000 μm, particularly preferably a sieve having a mesh size selected from the range of 38 μm to 500 μm, and most preferably a sieve having a mesh size selected from the range of 38 μm to 300 μm. Specifically, low-molecular-weight products and oligomers can be efficiently removed by specifically using a sieve having a mesh size of 150 μm (100 mesh (mesh count/inch)), a sieve having a mesh size of 105 μm (145 mesh (mesh count/inch)), a sieve having a mesh size of 75 μm (200 mesh (mesh count/inch)), a sieve having a mesh size of 38 μm (400 mesh (mesh count/inch)), or the like as the sieve used for recovery. It is more preferable to use a sieve having a mesh size of 150 μm (100 mesh (mesh count/inch)) capable of efficiently removing microparticulate byproduct salts.

With the manufacturing process of the present invention, a granular polymer captured as an oversize fraction by sifting with a sieve having a mesh size of at least 38 μm can generally be recovered with a yield of at least 80 mass %, preferably 80 to 99.5 mass %, more preferably 83 to 99 mass %, and particularly preferably 85 to 98 mass % with respect to the entire amount prior to sifting.

In addition, a granular PAS captured with a sieve having a mesh size of at least 150 μm can generally be recovered with a yield of at least 80 mass %, specifically 80 to 98 mass %, preferably 83 to 97 mass %, and particularly preferably 85 to 96 mass %.

These representative yields are also called oversize fractions (mass %). The oversize fraction (mass %) of the granular PAS was based on, as the entire amount of the PAS prior to sifting, the PAS mass (theoretical amount) determined under the assumption that all of the effective sulfur components in the charged sulfur source present in the reactor after the dehydration step are converted into a PAS. The oversize fraction (mass %) was calculated by the following formula: (oversize fraction)/(entire amount of PAS prior to sifting: PAS mass (theoretical amount)). When the charged sulfur source is charged at a greater molar ratio than that of the dihalo aromatic compound, it may not be possible for all of the charged sulfur source to be converted into a PAS, but in this case as well, the oversize fraction (mass %) is calculated based on the amount of the charged sulfur source. In the case of recovery by filter paper, the recovery rate is calculated by the following formula: fraction on filter paper/(entire amount of PAS prior to sifting: PAS mass (theoretical amount)).

3. Polyarylene Sulfide

The present invention yields a granular PAS, (i) the granular PAS containing an —S— substituent at the terminal, the —S— substituent being formed by cleavage of a disulfide compound; (ii) the granular PAS being an oversize fraction after sifting with a sieve having a mesh size of at least 38 μm; (iii) the granular PAS having a halogen content of at most 1,500 ppm; and (iv) the granular PAS being a granular PAS having a melt viscosity of 3 to 100 Pa·s when measured under conditions at a temperature of 310° C. and a shear rate of 1,200 sec$^{-1}$. In addition, with the present invention, the granular PAS is manufactured with a granular PAS manufacturing process comprising: a polymerization step of polymerizing a sulfur source and a dihalo aromatic compound in an organic amide solvent; a cooling step of cooling a liquid phase containing a produced polymer after the polymerization step; a separation/recovery step of separating and recovering the produced polymer; and a step of inducing a liquid-liquid phase separation state in which a produced polymer dense phase and a produced polymer dilute phase are both present in the presence of a phase separation agent during the polymerization step and/or prior to the cooling step; (i) the polymerization reaction being performed in the presence of a disulfide compound in the polymerization step; and (ii) an oversize fraction being obtained by sifting the produced polymer with a sieve having a mesh size of at least 38 μm in the separation/recovery step.

With the present invention, a granular PAS having a low halogen content, good thermal stability, low gas generation at the time of molding processing, and low melt viscosity can be obtained with high yield. That is, with the manufacturing process of the present invention, it is possible to obtain a granular PAS with a melt viscosity of typically 3 to 100 Pa·s, preferably 7 to 80 Pa·s, more preferably 10 to 70 Pa·s, particularly preferably 13 to 60 Pa·s, even more preferably 15 to 55 Pa·s, and most preferably 17 to 50 Pa·s as measured at a temperature of 310° C. and a shear rate of 1,200 sec$^{-1}$.

With the manufacturing process of the present invention, the halogen content (chlorine content) of the resulting granular PAS is at most 1,500 ppm, preferably at most 1,300 ppm, and more preferably at most 1,250 ppm. Depending on the application, the content may be at most 1,000 ppm and preferably at most 900 ppm or at most 850 ppm. The lower limit of the halogen content is typically approximately 100 ppm or approximately 200 ppm.

With the manufacturing process of the present invention, nitrogen content of the resulting granular PAS is at most 1,000 ppm, preferably at most 800 ppm, more preferably at most 700 ppm, even more preferably at most 650 ppm, and particularly preferably at most 600 ppm. The lower limit of the nitrogen content is approximately 1 ppm or approximately 2 ppm.

With the manufacturing process of the present invention, the average particle size of the resulting granular PAS is from 50 to 2,500 μm, preferably from 70 to 1,000 μm, more preferably from 100 to 800 μm, particularly preferably from 280 to 550 μm, and most preferably from 300 to 500 μm.

The granular PAS of the present invention can be molded into various injection molded products or extrusion molded products such as sheets, films, fibers, or pipes alone or by adding various synthetic resins, various fillers, and various additives without modification or after oxidative crosslinking. The granular PAS is useful as a sealant or coating agent for electronic parts. A PPS is particularly preferable as the PAS.

4. Resin Composition

When the granular PAS of the present invention is used as a composition, the other components are as follows. Thermoplastic resins that are stable at high temperatures are preferable as the various synthetic resins, and specific examples include aromatic polyesters such as polyethylene terephthalate or polybutylene terephthalate; fluorine resins such as polytetrafluoroethylene, tetrafluoroethylene/hexafluoropropylene copolymers, tetrafluoroethylene/perfluoroalkyl vinyl ether copolymers, polychlorotrifluoroethylene, polyvinylidene fluoride, vinylidene fluoride/hexafluoropropylene copolymers, propylene/tetrafluoroethylene copolymers, vinylidene fluoride/chlorotrifluoroethylene copolymers, and ethylene/hexafluoropropylene copolymers; polyacetals, polystyrenes, polyamides, polycarbonates, polyphenylene ethers, polyalkyl acrylates, ABS resins, polyvinyl chlorides, and the like. These thermoplastic resins may each be used alone or in a combination of two or more types thereof. When used as a compound containing an inorganic filler such as glass fibers, it is important to select resins having a low melt viscosity or inherent viscosity and good melting behavior for the various synthetic resins described above so that good moldability can be achieved in addition to the characteristics of a PAS with a low melt viscosity, which are features of the present invention.

Examples of various fillers are fibrous fillers including inorganic fibrous substances such as glass fibers, carbon fibers, asbestos fibers, silica fibers, alumina fibers, zirconia fibers, boron nitride fibers, silicon nitride fibers, boron fibers, and potassium titanate whiskers; metal fibrous substances such as stainless steel, aluminum, titanium, steel, and brass; and organic fibrous substances with a high melting point such as polyamides, fluorine resins, polyester resins, and acrylic resins. Additional examples of fillers include powder-like or sheet-like fillers such as mica, silica, talc, alumina, kaolin, calcium sulfate, calcium carbonate, titanium oxide, ferrite, glass powder, zinc oxide, nickel carbonate, iron oxide, quartz powder, magnesium carbonate, barium sulfate, and clay. These fillers may each be used alone or in a combination of two or more types thereof. These fillers may be treated with a sizing agent or a surface treatment agent as necessary. Examples of sizing agents or surface treatment agents include functional compounds such as epoxy compounds, isocyanate compounds, silane compounds, titanate compounds, and the like. These compounds may be used to perform surface treatment or sizing treatment on the fillers in advance or may be added at the same time as the adjustment of the composition. The filler is typically added in a range of 0 to 800 parts by mass, preferably 0 to 500 parts by mass, and more preferably 0 to 300 parts by mass per 100 parts by mass of the granular PAS. In particular, when an inorganic fibrous filler such as glass fibers is added as a filler, it is possible to obtain a resin composition and a molded product having excellent mechanical characteristics such as tensile strength. In the present invention, it is particularly preferable to use a compound containing a filler such as glass fibers. When used as a compound, it is common to add 45 to 100 parts by mass of glass fibers to 100 parts by mass of the PAS. When used as a compound, the regulation value of the halogen content is typically at most 900 ppm. In the case of a compound in the field of electrical/electronic equipment, the compounding ratio of the glass fibers is approximately 30 to 50 mass %, so using the granular PAS of the present invention results in a chlorine content that is sufficiently less than the regulation value.

Examples of various fillers include pigments, dyes, antioxidants, UV absorbents, lubricants, nucleating agents, flame retardants, resin enhancers, coupling agents, antistatic agents, conductive materials, carbon precursors, release agents, plasticizers, and the like.

EXAMPLES

The present invention will be described in further detail hereinafter using Working Examples and Comparative Examples, but the present invention is not limited to these working examples alone. The measurement methods for the physical properties and characteristics of the present invention are as follows.

(1) Recovery Rate of the Granular PAS (Oversize Fraction (Mass %))

After the reaction, the produced polymer (PAS) was sifted and sorted with a sieve having a mesh size of 38 μm (400 mesh (mesh count/inch)) or a sieve having a mesh size of 150 μm (100 mesh (mesh count/inch)) and was then washed. The oversize fraction (mass %) of the granular PAS was based on, as the entire amount of the PAS prior to sifting, the PAS mass (theoretical amount) determined under the assumption that all of the effective sulfur components in the charged sulfur source present in the reactor after the dehydration step are converted into a PAS. The oversize fraction (mass %) was calculated by the following formula: (oversize fraction)/(entire amount of PAS prior to sifting: PAS mass (theoretical amount)). When the charged sulfur source was charged at a greater molar ratio than that of the dihalo aromatic compound, it may not be possible for all of the charged sulfur source to be converted into a PAS, but in this case as well, the oversize fraction (mass %) was calculated based on the amount of the charged sulfur source. In the case of recovery by filter paper, the recovery rate was calculated by the following formula: fraction on filter paper/(entire amount of PAS prior to sifting: PAS mass (theoretical amount)).

(2) Halogen Content Measurement Method

The chlorine content was measured by combustion ion chromatography as the halogen content in the granular PAS.

(Measurement Conditions)

Ion Chromatograph: DX320 manufactured by DIONEX

Pretreatment devices for combustion: AQF-100, ABC, WS-100, and GA-100 manufactured by Mitsubishi Chemical Corporation Sample: 10 mg Heater: Inlet Temp/900° C., Outlet Temp/1000° C.

Absorption solution: $H_2O_2$ 900 ppm, internal standard: $PO_4^{3-}$ 25 ppm (3) Melt Viscosity Measurement Method The melt viscosity of the granular PAS was measured with a Capillograph 1C (registered trademark) manufactured by Toyo Seiki Seisaku-sho, Ltd. equipped with a nozzle having a diameter of 1.0 mmϕ and a length of 10.0 mm as a capillary. The preset temperature was 310° C. The polymer sample was introduced into the apparatus, and after the sample was held for 5 minutes, the melt viscosity was measured at a shear rate of 1,200 $sec^{-1}$.

(4) Average Particle Size

The average particle size of the produced polymer (granular PAS) recovered in the separation/recovery step was measured with a sifting method using a sieve having a mesh size of 2,800 μm (7 mesh (mesh count/inch)), a sieve having a mesh size of 1,410 μm (12 mesh (mesh count/inch)), a sieve having a mesh size of 1,000 μm (16 mesh (mesh count/inch)), a sieve having a mesh size of 710 μm (24 mesh (mesh count/inch)), a sieve having a mesh size of 500 μm (32 mesh (mesh count/inch)), a sieve having a mesh size of 250 μm (60 mesh (mesh count/inch)), a sieve having a mesh size of 150 μm (100 mesh (mesh count/inch)), a sieve having a mesh size of 105 μm (145 mesh (mesh count/inch)), a sieve having a mesh size of 75 μm (200 mesh (mesh count/inch)), and a sieve having a mesh size of 38 μm (400 mesh (mesh count/inch)) as a sieve, and the average particle size when the cumulative mass reached 50% mass was calculated from the mass of the oversize fraction of each sieve.

(5) Nitrogen Content Measurement

The nitrogen content of 10 mg of the granular PAS was measured using a trace nitrogen/sulfur analyzer (model "ANTEK 7000" manufactured by Astech Corporation). (Pyridine was used as a reference material)

Working Example 1

First, 6,001 g of N-methyl-2-pyrrolidone (hereafter abbreviated as "NMP"), 2,000 g of a sodium hydrosulfide aqueous solution (NaSH; purity: 62 mass %), and 1,171 g of a sodium hydroxide aqueous solution (NaOH; purity: 74.0 mass %) were charged into a 20-liter autoclave. The molar ratio of NaOH/NaSH (sulfur source) was 0.98.

As a dehydration step, after the inside of the autoclave was substituted with nitrogen gas, the inside of the autoclave was gradually heated to 200° C. while stirring with a stirrer at a revolution speed of 250 rpm over the course of 4 hours, and 1,014 g of water ($H_2O$), 763 g of NMP, and 12 g of hydrogen sulfide ($H_2S$) were distilled out.

After the dehydration step described above, the content of the autoclave was cooled to 150° C., and 3,264 g of p-dichlorobenzene (hereafter abbreviated as "p-DCB"), 2,707 g of NMP, 19 g of sodium hydroxide, and 167 g of water were added and reacted for 5 hours at 220° C. while stirring to perform pre-stage polymerization. The molar ratio of water/charged sulfur source was 1.5. The molar ratio of NaOH/charged sulfur source was 1.05. The ratio of NMP/charged sulfur source was 0.37 kg/mol. The molar ratio of p-DCB/charged sulfur source was 1.020. The conversion ratio of p-DCB at the time of the completion of pre-stage polymerization was 93%.

Next, 4.8 g of diphenyl disulfide (hereafter abbreviated as "DPDS") and 762 g of NMP were pressed into the mixture and reacted. The molar ratio of DPDS/charged sulfur source was 0.001. Next, 443 g of water was pressed into the mixture while stirring was continued, and the mixture was heated to 255° C. and reacted for 5 hours to perform post-stage polymerization. The molar ratio of water/charged sulfur source was 2.63.

After the completion of post-stage polymerization, the mixture was gradually cooled to 220° C. at a cooling rate of 1° C./min, and the mixture was then cooled from 220° C. to a temperature around room temperature. A granular polymer was sifted from the content using a sieve having a mesh size of 38 μm (400 mesh) and a sieve having a mesh size of 150 μm (100 mesh), and the granular PAS was washed 3 times with acetone and then 3 times with water. This granular PAS was washed once with an acetic acid aqueous solution adjusted to pH 4 and 3 times with water to obtain a washed granular PAS. The granular PAS obtained in this way was dried for one day and night at 100° C.

The average particle size of the granular PAS obtained in this way was 442 μm. In addition, the oversize fraction of the sieve having a mesh size of 150 μm (100 mesh) had a melt viscosity of 39 Pa·s, a chlorine content of 1,150 ppm, and a nitrogen content of 530 ppm, and the oversize fraction of the sieve having a mesh size of 38 μm (400 mesh) had a melt viscosity of 38 Pa·s, a chlorine content of 1,200 ppm, and a nitrogen content of 560 ppm. The oversize fraction (mass %) of the granular PAS was 91% in the case of the sieve having a mesh size of 150 μm (100 mesh) and 93% in the case of the sieve having a mesh size of 38 μm (400 mesh).

Working Example 2

Operations were performed in the same manner as in Working Example 1 with the exception of adding 14.3 g of DPDS when the p-DCB conversion ratio was 92% at the time of the completion of pre-stage polymerization and setting the molar ratio of DPDS/charged sulfur source to 0.003.

The average particle size of the granular PAS obtained in this way was 476 μm. In addition, the oversize fraction of the sieve having a mesh size of 150 μm (100 mesh) had a melt viscosity of 19 Pa·s, a chlorine content of 950 ppm, and a nitrogen content of 550 ppm. The oversize fraction of the sieve having a mesh size of 38 μm (400 mesh) had a melt viscosity of 19 Pa·s, a chlorine content of 1,100 ppm, and a nitrogen content of 575 ppm, and the product recovered with filter paper after passing through the sieve having a mesh size of 38 μm (400 mesh) had a melt viscosity of less than 1 Pa·s and a chlorine content of 20,500 ppm. The oversize fraction (mass %) of the granular PAS was 89% in the case of the sieve having a mesh size of 150 µm (100 mesh) and 91% in the case of the sieve having a mesh size of 38 µm (400 mesh).

Working Example 3

Operations were performed in the same manner as in Working Example 1 up to the dehydration step. After the dehydration step, the content of the autoclave was cooled to 150° C., and 3,280 g of p-DCB, 2,708 g of NMP, 19 g of sodium hydroxide, 167 g of water, and 9.5 g of DPDS were added and reacted for 5 hours at 220° C. while stirring to perform pre-stage polymerization. The conversion ratio of p-DCB when DPDS was added (that is, when the polymerization reaction was begun) was 0%. The molar ratio of water/charged sulfur source was 1.50. The molar ratio of NaOH/charged sulfur source was 1.05. The ratio of NMP/charged sulfur source was 0.38 kg/mol. The molar ratio of p-DCB/charged sulfur source was 1.025. The molar ratio of DPDS/charged sulfur source was 0.002. The conversion ratio of p-DCB at the time of the completion of pre-stage polymerization was 92%.

Next, 443 g of water was pressed into the mixture while stirring was continued, and the mixture was heated to 255° C. and reacted for 5 hours to perform post-stage polymerization. The molar ratio of water/charged sulfur source was 2.63. After the completion of post-stage polymerization, a granular PAS was obtained in the same manner as in Working Example 1.

The average particle size of the granular PAS obtained in this way was 398 µm. In addition, the oversize fraction of the sieve having a mesh size of 150 µm (100 mesh) had a melt viscosity of 41 Pa·s, a chlorine content of 1,200 ppm, and a nitrogen content of 530 ppm, and the oversize fraction of the sieve having a mesh size of 38 µm (400 mesh) had a melt viscosity of 40 Pa·s, a chlorine content of 1,200 ppm, and a nitrogen content of 560 ppm. The oversize fraction (mass %) of the granular PAS was 91% in the case of the sieve having a mesh size of 150 µm (100 mesh) and 93% in the case of the sieve having a mesh size of 38 µm (400 mesh).

Working Example 4

Operations were performed in the same manner as in Working Example 1 up to the dehydration step. After the dehydration step, the content of the autoclave was cooled to 150° C., and 3,248 g of p-DCB, 2,707 g of NMP, 19 g of sodium hydroxide, and 167 g of water were added and reacted for 5 hours at 220° C. while stirring to perform pre-stage polymerization. The molar ratio of water/charged sulfur source was 1.50. The molar ratio of NaOH/charged sulfur source was 1.05. The ratio of NMP/charged sulfur source was 0.37 kg/mol. The molar ratio of p-DCB/charged sulfur source was 1.015. The conversion ratio of p-DCB at the time of the completion of pre-stage polymerization was 94%.

Next, 9.5 g of DPDS and 762 g of NMP were pressed into the mixture and reacted. The molar ratio of DPDS/charged sulfur source was 0.002. Next, 443 g of water was pressed into the mixture while stirring was continued, and the mixture was heated to 255° C. and reacted for 5 hours to perform post-stage polymerization. The molar ratio of water/charged sulfur source was 2.63.

After the completion of post-stage polymerization, a granular PAS was obtained in the same manner as in Working Example 1. The average particle size of the granular PAS obtained in this way was 356 µm. In addition, the oversize fraction of the sieve having a mesh size of 150 µm (100 mesh) had a melt viscosity of 23 Pa·s, a chlorine content of 800 ppm, and a nitrogen content of 580 ppm, and the oversize fraction of the sieve having a mesh size of 38 µm (400 mesh) had a melt viscosity of 22 Pa·s, a chlorine content of 800 ppm, and a nitrogen content of 600 ppm. The oversize fraction (mass %) of the granular PAS was 88% in the case of the sieve having a mesh size of 150 µm (100 mesh) and 91% in the case of the sieve having a mesh size of 38 µm (400 mesh).

Comparative Example 1

Operations were performed in the same manner as in Working Example 3 with the exception that DPDS was not added. The average particle size of the obtained granular PAS was 651 µm. In addition, the oversize fraction of the sieve having a mesh size of 150 µm (100 mesh) had a melt viscosity of 128 Pa·s, a chlorine content of 1,100 ppm, and a nitrogen content of 575 ppm, and the oversize fraction of the sieve having a mesh size of 38 µm (400 mesh) had a melt viscosity of 120 Pa·s, a chlorine content of 1,150 ppm, and a nitrogen content of 580 ppm. The oversize fraction (mass %) of the granular PAS was 89% in the case of the sieve having a mesh size of 150 µm (100 mesh) and 91% in the case of the sieve having a mesh size of 38 µm (400 mesh).

Comparative Example 2

Operations were performed in the same manner as in Working Example 1 up to the dehydration step. After the dehydration step, the content of the autoclave was cooled to 150° C., and 3,360 g of p-DCB, 2,707 g of NMP, 19 g of sodium hydroxide, and 167 g of water were added and reacted for 5 hours at 220° C. while stirring to perform pre-stage polymerization. The molar ratio of water/charged sulfur source was 1.50. The molar ratio of NaOH/charged sulfur source was 1.05. The ratio of NMP/charged sulfur source was 0.38 kg/mol. The molar ratio of p-DCB/charged sulfur source was 1.050. The conversion ratio of p-DCB at the time of the completion of pre-stage polymerization was 92%. Next, 4.8 g of DPDS and 762 g of NMP were pressed into the mixture and reacted. The molar ratio of DPDS/charged sulfur source was 0.001. Next, 443 g of water was pressed into the mixture while stirring was continued, and the mixture was heated to 255° C. and reacted for 5 hours to perform post-stage polymerization. The molar ratio of water/charged sulfur source was 2.63.

Post-stage polymerization, cooling, separation, and recovery were performed in the same manner as in Working Example 1 to obtain a granular PAS. The average particle size of the granular PAS obtained in this way was 344 µm. In addition, the oversize fraction of the sieve having a mesh size of 150 µm (100 mesh) had a melt viscosity of 15 Pa·s, a chlorine content of 3,000 ppm, and a nitrogen content of 650 ppm, and the oversize fraction of the sieve having a mesh size of 38 µm (400 mesh) had a melt viscosity of 14 Pa·s, a chlorine content of 3,100 ppm, and a nitrogen content of 700 ppm. The oversize fraction (mass %) of the granular PAS was 88% in the case of the sieve having a mesh size of 150 µm (100 mesh) and 90% in the case of the sieve having a mesh size of 38 µm (400 mesh).

Comparative Example 3

Operations were performed in the same manner as in Working Example 1 up to pre-stage polymerization. When the conversion ratio of p-DCB was 93%, 4.8 g of DPDS and 762 g of NMP were pressed into the mixture and reacted. The molar ratio of DPDS/charged sulfur source was 0.001. Next, the mixture was heated to 255° C. and reacted for 5 hours while stirring using the amount of water used at the time of charging, without adding additional water, so as to perform post-stage polymerization.

After the completion of post-stage polymerization, the mixture was cooled to around room temperature, and when the content was sifted using a sieve having a mesh size of 150 μm (100 mesh), there was no oversize fraction present. The undersize fine powder (recovered with filter paper, recovery rate: 99%) had a chlorine content of 2,950 ppm and a nitrogen content of 2,000 ppm. The melt viscosity was 5 Pa·s.

Comparative Example 4

Operations were performed in the same manner as in Working Example 1 up to pre-stage polymerization. The conversion ratio of p-DCB at the time of the completion of pre-stage polymerization was 92%. Next, 95 g of DPDS and 762 g of NMP were pressed into the mixture and reacted. The molar ratio of DPDS/charged sulfur source was 0.020. Next, 443 g of water was pressed into the mixture while stirring was continued, and the mixture was heated to 255° C. and reacted for 5 hours to perform post-stage polymerization. The molar ratio of water/charged sulfur source was 2.63.

After the completion of post-stage polymerization, a granular PAS was obtained in the same manner as in Working Example 1. The average particle size of the granular PAS obtained in this way was 268 μm. In addition, the oversize fraction of the sieve having a mesh size of 150 μm (100 mesh) had a melt viscosity of 1.5 Pa·s, a chlorine content of 1,000 ppm, and a nitrogen content of 580 ppm, and the oversize fraction of the sieve having a mesh size of 38 μm (400 mesh) had a melt viscosity of 1 Pa·s, a chlorine content of 1,100 ppm, and a nitrogen content of 630 ppm. The oversize fraction (mass %) of the granular PAS was 51% in the case of the sieve having a mesh size of 150 μm (100 mesh) and 55% in the case of the sieve having a mesh size of 38 μm (400 mesh).

Comparative Example 5

Operations were performed in the same manner as in Working Example 2 with the exception of recovering the PAS using filter paper. The PAS recovered using filter paper (recovery rate: 99%) had a melt viscosity of 8 Pa·s, a chlorine content of 2,800 ppm, and a nitrogen content of 1,030 ppm.

Comparative Example 6

After the completion of the dehydration step, operations were performed in the same manner as in Working Example 1 with the exception that 3,392 g of p-DCB was added and that DPDS was not added.

After the completion of post-stage polymerization, a granular PAS was obtained in the same manner as in Working Example 1. The average particle size of the granular PAS obtained in this way was 389 μm. In addition, the oversize fraction of the sieve having a mesh size of 150 μm (100 mesh) had a melt viscosity of 30 Pa·s, a chlorine content of 3,800 ppm, and a nitrogen content of 830 ppm, and the oversize fraction of the sieve having a mesh size of 38 μm (400 mesh) had a melt viscosity of 27 Pa·s, a chlorine content of 3,950 ppm, and a nitrogen content of 870 ppm. The oversize fraction (mass %) of the granular PAS was 88% in the case of the sieve having a mesh size of 150 μm (100 mesh) and 93% in the case of the sieve having a mesh size of 38 μm (400 mesh).

Comparative Example 7

After the completion of the dehydration step, operations were performed in the same manner as in Working Example 1 with the exception that 3,263 g of p-DCB was added, 4,750 g of NMP was added, and DPDS was not added. After the completion of pre-stage polymerization, 650 g of water was pressed into the mixture while stirring was continued, and the mixture was heated to 255° C. and reacted for 5 hours to perform post-stage polymerization. The molar ratio of water/charged sulfur source was 3.16.

After the completion of post-stage polymerization, a granular PAS was obtained in the same manner as in Working Example 1. The average particle size of the granular PAS obtained in this way was 1,200 μm. In addition, the oversize fraction of the sieve having a mesh size of 150 μm (100 mesh) had a melt viscosity of 300 Pa·s, a chlorine content of 700 ppm, and a nitrogen content of 350 ppm, and the oversize fraction of the sieve having a mesh size of 38 μm (400 mesh) had a melt viscosity of 290 Pa·s, a chlorine content of 800 ppm, and a nitrogen content of 380 ppm. The oversize fraction (mass %) of the granular PAS was 84% in the case of the sieve having a mesh size of 150 μm (100 mesh) and 85% in the case of the sieve having a mesh size of 38 μm (400 mesh).

The working examples and comparative examples are shown in Tables 1 and 2.

TABLE 1

| | | Working Example 1 | Working Example 2 | Working Example 3 | Working Example 4 | Comparative Example 1 | Comparative Example 2 |
|---|---|---|---|---|---|---|---|
| Polymerization conditions | p-DCB/charged sulfur source (mol/mol) | 1.020 | 1.020 | 1.025 | 1.015 | 1.025 | 1.050 |
| | Water/charged sulfur source (mol/mol) in post-stage polymerization step | 2.63 | 2.63 | 2.63 | 2.63 | 2.63 | 2.63 |
| | Conversion ratio (%) of p-DCB when DPDS was added | 93 | 92 | 0 | 94 | — | 92 |
| | DPDS added amount/charged sulfur source (mol/mol) | 0.001 | 0.003 | 0.002 | 0.002 | 0 | 0.001 |

TABLE 1-continued

| Polymerization results | | | | | | | |
|---|---|---|---|---|---|---|---|
| | Melt viscosity (Pa·s) Oversize fraction using a sieve having a mesh size of 150 μm | 39 | 19 | 41 | 23 | 128 | 15 |
| | Melt viscosity (Pa·s) Oversize fraction using a sieve having a mesh size of 38 μm | 38 | 19 | 40 | 22 | 120 | 14 |
| | Chlorine content (ppm) Oversize fraction using a sieve having a mesh size of 150 μm | 1,150 | 950 | 1,200 | 800 | 1,100 | 3,000 |
| | Chlorine content (ppm) Oversize fraction using a sieve having a mesh size of 38 μm | 1,200 | 1,100 | 1,200 | 800 | 1,150 | 3,100 |
| | Nitrogen content (ppm) Oversize fraction using a sieve having a mesh size of 150 μm | 530 | 550 | 530 | 580 | 575 | 650 |
| | Nitrogen content (ppm) Oversize fraction using a sieve having a mesh size of 38 μm | 560 | 575 | 560 | 600 | 580 | 700 |
| | Average particle size (μm) | 442 | 476 | 398 | 356 | 651 | 344 |
| | Oversize fraction using a sieve having a mesh size of 150 μm (%) | 91 | 89 | 91 | 88 | 89 | 88 |
| | Oversize fraction using a sieve having a mesh size of 38 μm (%) | 93 | 91 | 93 | 91 | 91 | 90 |

| | | Comparative Example 3 | Comparative Example 4 | Comparative Example 5 | Comparative Example 6 | Comparative Example 7 |
|---|---|---|---|---|---|---|
| Polymerization conditions | p-DCB/charged sulfur source (mol/mol) | 1.020 | 1.020 | 1.020 | 1.060 | 1.020 |
| | Water/charged sulfur source (mol/mol) in post-stage polymerization step | 1.50 | 2.63 | 2.63 | 2.63 | 3.16 |
| | Conversion ratio (%) of p-DCB when DPDS was added | 93 | 92 | 92 | — | — |
| | DPDS added amount/charged sulfur source (mol/mol) | 0.001 | 0.020 | 0.003 | 0 | 0 |
| Polymerization results | Melt viscosity (Pa·s) Oversize fraction using a sieve having a mesh size of 150 μm | — | 1.5 | — | 30 | 300 |
| | Melt viscosity (Pa·s) Oversize fraction using a sieve having a mesh size of 38 μm | 5 (Recovered with filter paper) | 1.0 | 8 (Recovered with filter paper) | 27 | 290 |

TABLE 1-continued

| | | | | | |
|---|---|---|---|---|---|
| Chlorine content (ppm) Oversize fraction using a sieve having a mesh size of 150 μm | — | 1,000 | — | 3,800 | 700 |
| Chlorine content (ppm) Oversize fraction using a sieve having a mesh size of 38 μm | 2,950 (Recovered with filter paper) | 1,100 | 2,800 (Recovered with filter paper) | 3,950 | 800 |
| Nitrogen content (ppm) Oversize fraction using a sieve having a mesh size of 150 μm | — | 580 | — | 830 | 350 |
| Nitrogen content (ppm) Oversize fraction using a sieve having a mesh size of 38 μm | 2,000 (Recovered with filter paper) | 630 | 1,030 (Recovered with filter paper) | 870 | 380 |
| Average particle size (μm) | — | 268 | — | 389 | 1,200 |
| Oversize fraction using a sieve having a mesh size of 150 μm (%) | — | 51 | — | 88 | 84 |
| Oversize fraction using a sieve having a mesh size of 38 μm (%) | (Recovered with filter paper) | 55 | (Recovered with filter paper) | 93 | 85 |

TABLE 2

| | Working Examples | | | | Comparative Examples | |
|---|---|---|---|---|---|---|
| | 1 | 2 | 3 | 4 | 1 | 2 |
| Characteristics of manufacturing conditions | | DPDS addition timing | | | DPDS not added | p-DCB/charged sulfur source outside upper limit range |
| Characteristics of results | | in a range of the present invention | | | Melt viscosity Outside upper limit range | Chlorine content Outside upper limit range |

| | Comparative Examples | | | | |
|---|---|---|---|---|---|
| | 3 | 4 | 5 | 6 | 7 |
| Characteristics of manufacturing conditions | Outside the range of the amount of coexisting water in the post-stage polymerization step, filter paper recovery (recovery rate: 99%) | DPDS added amount outside upper limit range | Filter paper recovery in Working Example 2 (recovery rate: 99%) | DPDS not added | DPDS not added |
| Characteristics of results | No oversize granular substance using a sieve having a mesh size of 150 μm Chlorine content Outside upper limit range | Melt viscosity Outside lower limit range Small amount of oversize fraction | Chlorine content Outside upper limit range | Chlorine content Outside upper limit range | Melt viscosity Outside upper limit range |

(Discussion)

Comparative Example 1 is a case in which DPDS was not added. In this case, the melt viscosity of the resulting granular PAS is a value outside the upper limit range of the present invention. Comparative Example 2 is a case in which the value of the dihalo aromatic compound with respect to the charged sulfur source is outside the upper limit range. In this case, the chlorine content of the resulting granular PAS is a value outside the upper limit range of the present invention. Comparative Example 3 is a case in which the amount of coexisting water in the post-stage polymerization step is outside the lower limit range of the present invention. When sifted with a sieve having a mesh size of 150 μm, no oversize fraction is observed as a granular PAS. The melt viscosity of the PAS recovered with filter paper is outside the lower limit range of the present invention, and the chlorine content is outside the upper limit range of the present invention. Comparative Example 4 is a case in which the amount of DPDS that was added was outside the upper limit range of the present invention. In this case, the melt viscosity of the resulting granular PAS is a value outside the lower limit range of the present invention, and the yield is poor. Comparative Example 5 is a case in which sifting is not performed in Working Example 2. The melt viscosity of the PAS recovered with filter paper is outside the lower limit range of the present invention, and the chlorine content is outside the upper limit range of the present invention. Comparative Examples 6 and 7 are cases in which DPDS was not added. In addition, Comparative Example 6 is a case in which the value of the dihalo aromatic compound with respect to the charged sulfur source is outside the upper limit range.

Comparative Examples 1, 6, and 7 illustrate the conventional technology level not using DPDS, which differs from the level of the present invention (hereafter expressed as a numerical value of the oversize fraction of a sieve having a mesh size of 150 µm). That is, when the melt viscosity decreases from 300 Pa·s (Comparative Example 7) to 128 Pa·s (Comparative Example 1) and then to 30 Pa·s (Comparative Example 6), the chlorine content increases from 700 ppm (Comparative Example 7) to 1100 ppm (Comparative Example 1) and then to 3800 ppm (Comparative Example 6). In other words, a reduction in the melt viscosity (increase in fluidity) and a reduction in halogen have an antinomic relationship. This is clearly seen when examining FIG. 1, which plots the chlorine content and the melt viscosity. That is, while Working Examples 1 to 4 demonstrate specific effects with a low melt viscosity and low chlorine content, the comparative examples demonstrate high chlorine content when the melt viscosity is low (Comparative Example 6) and low chlorine content when the melt viscosity is high (Comparative Example 7). In addition, even when the melt viscosity and chlorine content are reduced within the ranges of the conventional technology (Comparative Example 1), the levels do not reach the low melt viscosity and low chlorine content of the working examples.

In contrast, in Working Examples 1 to 4, a granular PAS having a balance of melt viscosity, chlorine content, nitrogen content, thermal stability, and yield is obtained.

INDUSTRIAL APPLICABILITY

The granular PAS obtained with the present invention has a balance of melt viscosity, halogen content, nitrogen content, thermal stability, and yield, so the granular PAS of the present invention can be suitably used in a wide range of fields such as electrical/electronic equipment and automobile equipment.

The invention claimed is:

1. A process for manufacturing a granular polyarylene sulfide containing an —S— substituent at a terminal, the —S— substituent being formed by cleavage of a disulfide compound, having a halogen content of at most 1,500 ppm, and having a melt viscosity of 3 to 100 Pa·s when measured under conditions at a temperature of 310° C. and a shear rate of 1,200 sec$^{-1}$, the process comprising the steps of: polymerizing a sulfur source and a dihalo aromatic compound in an organic amide solvent; cooling a liquid phase containing a produced polymer after the polymerization step; separating and recovering the produced polymer; and inducing a liquid-liquid phase separation state in which a produced polymer dense phase and a produced polymer dilute phase are both present in the presence of a phase separation agent during the polymerization step and/or prior to the cooling step;

(i) the polymerization reaction being performed in the presence of a disulfide compound in the polymerization step, wherein the disulfide compound is absent in the polymerization step before a conversion ratio of the dihalo aromatic compound reaches 45%; and (ii) an oversize fraction being obtained by sifting the produced polymer with a sieve having a mesh size of at least 38 µm in the separation/recovery step.

2. The process for manufacturing a granular polyarylene sulfide according to claim 1, wherein the polymerization step includes a phase separation polymerization step of continuing the polymerization reaction in a liquid-liquid phase separation state in which the produced polymer dense phase and the produced polymer dilute phase are both present in the liquid phase in a polymerization reaction system in the presence of a phase separation agent.

3. The process for manufacturing a granular polyarylene sulfide according to claim 1, wherein the phase separation agent is at least one type of a phase separation agent selected from the group consisting of water, organic carboxylic acid metal salts, organic sulfonic acid metal salts, alkali metal halides, alkali earth metal halides, alkali earth metal salts of aromatic carboxylic acids, phosphoric acid alkali metal salts, alcohols, and paraffin hydrocarbons.

4. The process for manufacturing a granular polyarylene sulfide according to claim 1, wherein the phase separation agent is used at 0.01 to 15 mol per 1 mol of the charged sulfur source.

5. The process for manufacturing a granular polyarylene sulfide according to claim 1, wherein the polymerization reaction in the polymerization step is performed in the presence of 0.0005 to 0.015 mol of the disulfide compound per 1 mol of the charged sulfur source.

6. The process for manufacturing a granular polyarylene sulfide according to claim 1, wherein the disulfide compound is diphenyl disulfide.

7. The process for manufacturing a granular polyarylene sulfide according to claim 1, wherein the sieving has a mesh size of at least 150 µm.

8. The process for manufacturing a granular polyarylene sulfide according to claim 1, wherein an oversize fraction after sifting with a sieve having a mesh size of at least 150 µm is at least 80 mass % with respect to the entire amount prior to sifting.

9. The process for manufacturing a granular polyarylene sulfide according to claim 1, wherein the polymerization step is performed with at least a two-stage process below:

(I) a pre-stage polymerization step of subjecting a sulfur source and a dihalo aromatic compound to a polymerization reaction at a temperature of 170 to 270° C. in an organic amide solvent in the presence of 0.02 to 2 mol of coexisting water and 1.005 to 1.040 mol of a dihalo aromatic compound per 1 mol of the charged sulfur source so as to produce a polymer with an 80 to 99% conversion ratio of the dihalo aromatic compound; and (II) a post-stage polymerization step of converting the liquid phase inside the polymerization reaction system to the phase separation state by heating the mixture to a temperature of 240 to 290° C. in the presence of a phase separation agent at a concentration in a range of 0.01 to 10 mol per 1 mol of the charged sulfur source and then continuing the polymerization reaction.

10. The process for manufacturing a granular polyarylene sulfide according to claim 4, wherein when the phase separation agent is water, an amount of coexisting water inside the polymerization reaction system is adjusted so that 2 to 5 mol of water is present per 1 mol of the charged sulfur source.

11. The process for manufacturing a granular polyarylene sulfide according to claim 4, wherein when the phase separation agent is at least one type of phase separation agent selected from the group consisting of organic carboxylic acid metal salts, organic sulfonic acid metal salts, alkali metal halides, alkali earth metal halides, alkali earth metal salts of aromatic carboxylic acids, phosphoric acid alkali metal salts, alcohols, and paraffin hydrocarbons, the phase separation agent is made to be present in a range of 0.01 to 3 mol per 1 mol of the charged sulfur source.

12. The process for manufacturing a granular polyarylene sulfide according to claim 4, wherein when another phase separation agent other than water is used in combination with water, an amount of coexisting water is adjusted to 0.01 to 7 mol per 1 mol of the charged sulfur source, and the other phase separation agent other than water is made to be present in a range of 0.01 to 3 mol per 1 mol of the charged sulfur source.

* * * * *